US011542801B2

(12) United States Patent
Chen et al.

(10) Patent No.: US 11,542,801 B2
(45) Date of Patent: Jan. 3, 2023

(54) OPTIMIZED DESIGN METHOD FOR TEMPORARY BLOCKING AGENT TO PROMOTE UNIFORM EXPANSION OF FRACTURES PRODUCED BY FRACTURING IN HORIZONTAL WELLS

(71) Applicant: Southwest Petroleum University, Sichuan (CN)

(72) Inventors: Xiyu Chen, Sichuan (CN); Yongming Li, Sichuan (CN); Jinzhou Zhao, Sichuan (CN)

(73) Assignee: SOUTHWEST PETROLEUM UNIVERSITY, Sichuan (CN)

( * ) Notice: Subject to any disclaimer, the term of this patent is extended or adjusted under 35 U.S.C. 154(b) by 432 days.

(21) Appl. No.: 16/739,806

(22) Filed: Jan. 10, 2020

(65) Prior Publication Data
US 2020/0386081 A1    Dec. 10, 2020

(30) Foreign Application Priority Data

Jun. 5, 2019  (CN) .......................... 201910487076.4

(51) Int. Cl.
*E21B 43/26*   (2006.01)
*G06F 30/28*   (2020.01)
(Continued)

(52) U.S. Cl.
CPC .............. *E21B 43/26* (2013.01); *C09K 8/516* (2013.01); *E21B 33/13* (2013.01); *E21B 49/00* (2013.01);
(Continued)

(58) Field of Classification Search
CPC .......... E21B 43/26; E21B 33/13; E21B 49/00; E21B 33/134; E21B 43/261;
(Continued)

(56) References Cited

U.S. PATENT DOCUMENTS

| 9,715,026 B2 * | 7/2017 | Ejofodomi | ............. | G01V 1/288 |
| 2003/0181338 A1 * | 9/2003 | Sweatman | ............ | E21B 21/003 |
| | | | | 507/100 |

(Continued)

FOREIGN PATENT DOCUMENTS

| CN | 109145497 A * | 1/2019 | ......... | G06F 17/5009 |
| WO | WO-2018034652 A1 * | 2/2018 | ............. | E21B 41/00 |

OTHER PUBLICATIONS

Van Domelen, Mary S. "A practical guide to modern diversion technology." (SPE, 2017) SPE-185120-MS at SPE Oklahoma City oil and gas symposium, pp. 1-22 (Year: 2017).*

(Continued)

*Primary Examiner* — Rehana Perveen
*Assistant Examiner* — Daniel E Miller
(74) *Attorney, Agent, or Firm* — Muncy, Geissler, Olds & Lowe, P.C.

(57) ABSTRACT

The present invention discloses an optimized design method for a temporary blocking agent to promote uniform expansion of fractures produced by fracturing in horizontal wells, which comprises the following steps: calculating a particle size and a volume range of a candidate temporary blocking agent in an applicable target area; establishing a hydraulic fracture expansion calculation model with complete fluid-solid coupling; calculating an optimal average particle size required for effective temporary blocking; determining the particle size distribution of the temporarily blocked particles according to the optimal average particle size; calculating the particle volume of the temporary blocking agent required for effective temporary blocking; and predicting and evaluating a fracturing effect after the preferred temporary blocking design is adopted in the target area. The optimized design method for the temporary blocking agent to promote uniform expansion of fractures produced by fracturing in horizontal wells is used for improving the uniformity of
(Continued)

fracture development of staged multi-cluster fracturing in horizontal wells, and has practicability and accuracy.

6 Claims, 3 Drawing Sheets

(51) Int. Cl.
| | |
|---|---|
| *C09K 8/516* | (2006.01) |
| *E21B 33/13* | (2006.01) |
| *E21B 49/00* | (2006.01) |
| *G06F 111/10* | (2020.01) |
| *E21B 43/267* | (2006.01) |
| *C09K 8/62* | (2006.01) |
| *E21B 33/134* | (2006.01) |

(52) U.S. Cl.
CPC ............... *G06F 30/28* (2020.01); *C09K 8/62* (2013.01); *E21B 33/134* (2013.01); *E21B 43/261* (2013.01); *E21B 43/267* (2013.01); *E21B 2200/20* (2020.05); *G06F 2111/10* (2020.01)

(58) Field of Classification Search
CPC ... E21B 43/267; E21B 2200/20; C09K 8/516; C09K 8/62; G06F 30/28; G06F 2111/10; G06F 17/5009
See application file for complete search history.

(56) References Cited

U.S. PATENT DOCUMENTS

| | | | | |
|---|---|---|---|---|
| 2012/0285692 | A1* | 11/2012 | Potapenko | ............ E21B 21/003 |
| | | | | 166/308.1 |
| 2018/0238169 | A1* | 8/2018 | Sun | ..................... E21B 41/0092 |
| 2022/0034219 | A1* | 2/2022 | Karale | ................... E21B 47/06 |

OTHER PUBLICATIONS

Whitfill, Don. "Lost circulation material selection, particle size distribution and fracture modeling with fracture simulation software." (SPE, 2008) IADC/SPE 115039 In IADC/SPE Asia Pacific drilling technology conference and exhibition, pp. 1-12 (Year: 2008).*

Valko, Peter, and Michael J. Economides. Hydraulic fracture mechanics. (Chichester: Wiley, 1995) vol. 28. pp. 25, 192-195. ISBN 0471956643 (Year: 1995).*

Geertsma, J., and F. De Klerk. "A rapid method of predicting width and extent of hydraulically induced fractures." Journal of petroleum technology 21, No. 12 (1969): 1571-1581. (Year: 1969).*

Huang, Jian, Reza Safari, and Francisco E. Fragachan. "Applications of self-degradable particulate diverters in wellbore stimulations: hydraulic fracturing and matrix acidizing case studies." (SPE, 2018) SPE-191408-18IHFT-MS, SPE International Hydraulic Fracturing Technology Conf. pp. 1-23. (Year: 2018).*

\* cited by examiner

OPTIMIZED DESIGN METHOD FOR TEMPORARY BLOCKING AGENT TO PROMOTE UNIFORM EXPANSION OF FRACTURES PRODUCED BY FRACTURING IN HORIZONTAL WELLS

TECHNICAL FIELD

The present invention belongs to the field of oil and gas field development, and relates to an optimized design method for a temporary blocking agent to promote uniform expansion of fractures produced by fracturing in horizontal wells.

BACKGROUND

Compared with conventional oil and gas reservoirs, reservoir porosity and permeability of unconventional low-permeability oil and gas reservoirs such as shale gas reservoirs are extremely low. It is difficult to form effective industrial production capacity during the development using vertical well technology and conventional fracturing process. At present, the staged multi-cluster fracturing technology of horizontal wells has become the most effective means of increasing production and transformation in the development of unconventional low-permeability reservoirs. By means of the staged multi-cluster fracturing technology of horizontal wells, multiple hydraulic fractures can be simultaneously formed under a single pump injection, which significantly reduces the cost of fracturing construction, making it possible to commercialize unconventional reservoirs.

However, the optimized design of staged multi-cluster fracturing in horizontal wells is relatively difficult. Because several hydraulic fractures are formed and expanded simultaneously in staged multi-cluster fracturing, it is difficult for engineers to independently control the size of each hydraulic fracture. When the staged multi-cluster fracturing technology for horizontal wells is adopted, it is difficult for a plurality of hydraulic fractures in the fracturing section to expand uniformly. Production log data shows that approximately 20% of perforation clusters provide 80% yield after fracturing, while approximately 30% of the perforation clusters are ineffective. The non-uniform expansion of multiple hydraulic fractures has impaired the stimulation effect of staged multi-cluster fracturing in horizontal wells, which has made the low-permeability reservoirs fail to be reconstructed to the greatest extent, and has become a serious problem to be solved. Some scholars have proposed techniques such as a perforating current-limiting method and an optimized fracture laying method to reduce the development gap between fractures. However, due to high dependence of these methods on the high-precision identification of geological parameters, the performances of these processes are relatively unstable. In recent years, engineers have attempted to add temporary blocking agent solid particles to the fracturing fluid to promote uniform expansion of multiple fractures. The core idea of this technology is that since most of the fracturing fluid will enter dominant fractures, the temporary blocking agent particles pumped with the fluid will quickly accumulate and block the dominant fracture inlets and rapidly increase the flow resistance, thereby forcing the fracturing fluid to enter the inferior fractures, and finally achieving the synchronous expansion of multiple fractures. Up to now, the related researches on temporary blocking operation have mainly focused on the selection and development of temporary blocking materials and laboratory testing of the performances of temporary blocking agents. There is little scientific optimization design for the application effect of temporary blocking agents in engineering. The rheological behaviors of a suspension in a static plate fracture are mainly considered in the conventional calculation method of for migration blockage of the temporary blocking agent, which is neither coupled with the mechanical process of dynamic expansion of hydraulic fractures, nor considers the mutual stress interference between multiple fractures. Due to the lack of scientific and rational optimization design methods, engineers can only carry out temporary blocking operations based on engineering experiences, resulting in relatively poor application success rate of temporary blocking agents.

In summary, the current temporary blocking optimization design to promote the uniform expansion of fractures produced by fracturing in horizontal wells should have the following two characteristics: 1. a set of accurate calculation models for migration blockage of the temporary blocking agent in fractures, that considers the dynamic expansion of fractures; 2. an optimized design method for temporary blocking effect that fully considers mutual interference between multiple fractures.

SUMMARY

The present invention mainly overcomes the deficiencies in the prior art, and proposes an optimized design method for a temporary blocking agent to promote uniform expansion of fractures produced by fracturing in horizontal wells, which is used for improving the uniformity of the development of fractures in staged multi-cluster fracturing in horizontal wells, and has practicability and accuracy.

The technical solution provided by the present invention to solve the above technical problems is: an optimized design method for a temporary blocking agent to promote uniform expansion of fractures produced by fracturing in horizontal wells, comprising the following steps:

Step S10, collecting reservoir geological and engineering parameters of a target area, and calculating a particle size and a volume range of a candidate temporary blocking agent in an applicable target area;

Step S20, establishing a hydraulic fracture expansion calculation model with complete fluid-solid coupling;

Step S30, calculating an optimal average particle size required for effective temporary blocking based on the hydraulic fracture expansion calculation model;

Step S40, determining the particle size distribution of the temporarily blocked particles according to the optimal average particle size;

Step S50, calculating the particle volume of the temporary blocking agent required for effective temporary blocking based on the hydraulic fracture expansion calculation model; and Step S60, predicating and evaluating a fracturing effect after the preferred temporary blocking design is adopted in the target area.

In a further technical solution, the specific process of the step S10 is as follows:

Step S101: collecting geological and engineering parameters of the target area; and Step S102, calculating a particle size range of the candidate temporary blocking agent particles according to the geological and engineering parameters of the target area, wherein a calculation equation of the particle size of the candidate temporary blocking agent particles is as follows:

$$a = \lambda_1^{-1} \left[ \frac{12\mu Q^3 t_s^2 (1-v^2)}{h^3 E} \right]^{\frac{1}{6}} \quad (1)$$

where: a is the average particle size of the temporary blocking agent, m; E is the Young's modulus of a reservoir rock, MPa; v is the Poisson's ratio of the reservoir rock, no dimension; μ is the viscosity of pure fracturing fluid, MPa·s; h is a reservoir thickness, m; $t_s$ is a pumping time before the temporary blocking operation, s; Q is a total pumping flow of the fracturing fluid, m³/s; $\lambda_1$ is a constant coefficient, no dimension; the values of $\lambda_1$ are 4, 5, 6, 7, and 8, and the average particle size values $a_1$ to $a_5$ of five sets of different candidate temporary blocking agents are calculated;

Step S103, calculating the particle volume range of an applicable candidate temporary blocking agent by using the following equation;

$$V_p = \frac{C_{max}\xi}{\lambda_2} \left[ \frac{12Q^3 h^3 (1-v^2)\mu t_s^2}{E} \right]^{\frac{1}{6}} \quad (2)$$

where: E is the Young's modulus of the reservoir rock, MPa; v is the Poisson's ratio of the reservoir rock, no dimension; μ is the viscosity of pure fracturing fluid, MPa·s; h is the reservoir thickness, m; $t_s$ is the pumping time before temporary blocking operation, s; Q is the total pumping flow rate of fracturing fluid, m³/s; $\lambda_2$ is a constant coefficient, no dimension; $V_p$ is the particle volume of the temporary blocking agent, m; $C_{max}$ is an extreme particle volume concentration, the value is 0.585, no dimension; ξ is a stable temporary blocking layer thickness (measured by a temporary physical experiment) of the temporary blocking agent particles, m;

the values of $\lambda_2$ are 0.15, 0.2, 0.25, 0.3, and 0.35, and the average particle size values $V_1$ to $V_5$ of five sets of different candidate temporary blocking agents are calculated.

In a further technical solution, the hydraulic fracture expansion calculation model in step S20 is as follows:

first, the entire fracturing process is divided into several time units. In each time unit, a fluid-solid coupling equation is calculated to obtain the fracture width w and the fluid pressure p in the fracture as follows:

$$w = \Delta t [Q_s A(D, w)p] + \Delta t (Q_{V,n}/h)\delta + w_{t-1} \quad (3)$$

where $$Q_s = (1-\phi)^2, \phi = \frac{C}{C_{max}} \quad (4)$$

the calculated boundary conditions of equation (3) above are as follows:

$$\begin{cases} p_{in}^1 + p_p^1 + p_{in}^2 + p_p^2 = \ldots = p_{in}^n + p_p^n \\ Q = \sum_{n=1}^{N} Q_{V,n} \end{cases} \quad (5)$$

after obtaining the fracture width w and the fluid pressure p in the fracture, the expansion direction of the hydraulic fracture expansion is further calculated, and the fracture expansion path is determined:

$$\tan(\theta/2) = -\frac{2\kappa}{1+\sqrt{1+8\kappa^2}}, \kappa = \lim_{r \to 0} \frac{u}{w} \quad (6)$$

after that, the particle distribution concentration of the temporary blocking agent in the time unit is calculated:

$$w\phi - w_{t-1}\phi_{t-1} = \Delta t \nabla \left( BQ_s Q_p \frac{w^3}{12\mu} \nabla p - B \frac{a^2 w}{48\mu} \Delta \rho G_p \right) + \Delta t (Q_v/h)\Phi\delta \quad (7)$$

where $$Q_p = 1.2\phi(1-\phi)^{0.1} \quad (8)$$

$$G_p = 2.3\phi(1-\phi)^2 \quad (9)$$

$$B = \begin{cases} 1 & w > 4a \\ \frac{w-3a}{4a-3a} & 4a \geq w \geq 3a \\ 0 & w < 3a \end{cases} \quad (10)$$

where: w is the width of a hydraulic fracture, m; $w_{t-1}$ is a fracture width of the previous time unit, m; D is a fracture spacing, m; p is a fluid pressure within the fracture, MPa; A(D, w) is a fluid-solid coupling coefficient matrix, m·MPa⁻¹; Δt is a time unit, s; h is a reservoir thickness, m; δ is a Dirac δ function, representing a fracturing fluid injection point source, m⁻¹; $Q_s$ is a fluid flow behavior correction function, no dimension; C is a particle volume concentration, no dimension; $C_{max}$ is an extreme particle volume concentration, the value is 0.585, no dimension; φ is a dimensionless particle volume concentration of the temporary blocking agent, no dimension; $Q_{v,n}$ is a fracturing fluid pumping flow rate of the $n^{th}$ fracture, m³/s; N is the number of hydraulic fractures in the fracturing section, no dimension; $p_{in}$ is a fracture inlet pressure of the $n^{th}$ fracture, MPa; $p_p$ is the perforation hole friction of the $n^{th}$ fracture, MPa; $\theta$ is a steering angle of the hydraulic fracture, no dimension; $\kappa$ is a ratio of a type II stress intensity factor to a type I stress intensity factor, no dimension; $\varphi_{t-1}$ is a dimensionless particle volume concentration of the previous time unit, no dimension; u is the fracture surface shear amount, m; r is a distance between any point and the fracture tip, m; $\Phi$ is a dimensionless particle volume concentration of pumped fluid, no dimension; $\mu$ is pure fracturing fluid viscosity, MPa·s; $Q_p$ is a temporary blocking agent particle migration behavior correction function, no dimension; $G_p$ is a temporary blocking agent particle settlement behavior correction function, no dimension; B is a temporary blocking agent particle blockage behavior correction function, no dimension; $\Delta\rho$ is a density difference between the temporary blocking agent particles and the fracturing fluid, kg/m³; a is the average particle size of the temporary blocking agent particles, m.

The temporary blocking agent concentration equations of the above equations (7) to (10) can be solved by the finite volume method of the Godunov format or other similar fluid algorithms. When the dimensionless particle volume concentration $\varphi$ at a certain point in the hydraulic fracture reaches 1, the clogging phenomenon occurs. The above equations (3) to (10) constitute a complete hydraulic fracture expansion model, and the solution flow is shown in FIG. 1.

In a further technical solution, the specific process of the step S30 is as follows:

Step S301, based on the hydraulic fracture expansion calculation model for establishing complete fluid-solid coupling, substituting the geological and engineering design parameters of the target area, taking the particle volume of the candidate temporary blocking agent calculated when $\lambda_2$ is 0.25, respectively taking the average particle size of five sets of different candidate temporary blocking agents and performing analog calculation to obtain five sets of different hydraulic fracturing results;

Step S302, then calculating a coefficient of variation $C_v$ of each hydraulic fracture length after five sets of different hydraulic fracturing respectively by the following equation;

$$C_v = \frac{\sigma_1}{\left(\sum_n^N l_n\right)/N} \tag{11}$$

where: $C_v$ is the coefficient of variation of each hydraulic fracture length, no dimension; $\sigma_1$ is a standard deviation of each hydraulic fracture length, m; $l_n$ is a fracture length of the $n^{th}$ fracture, m; N is the number of hydraulic fractures in the fracturing section, no dimension;

Step S303, based on the five sets of different hydraulic fracturing calculation results, selecting the average particle size of the candidate temporary blocking agent particles corresponding to the lowest $C_v$ value as the optimal average particle size $a_r$.

In a further technical solution, the specific process of the step S40 is as follows:

Step S401, according to the optimal average particle size $a_r$ and a correspondence table between common particle sizes and mesh numbers, selecting two kinds of particles of larger and smaller particles for use in combination, wherein the particle size $a_b$ of the larger particle is larger than the optimal average particle size $a_r$, and the particle size $a_s$ of the smaller particle is less than the optimal average particle size $a_r$;

TABLE 1

Table of correspondence between common particle sizes and mesh numbers

| Particle size (mm) | 4.76 | 4.00 | 3.36 | 2.83 | 2.38 | 2.00 | 1.68 | 1.41 |
|---|---|---|---|---|---|---|---|---|
| Mesh number of particles | 4 | 5 | 6 | 7 | 8 | 10 | 12 | 14 |
| Particle size (mm) | 1.19 | 1.00 | 0.841 | 0.707 | 0.595 | 0.500 | 0.400 | 0.297 |
| Mesh number of particles | 16 | 18 | 20 | 25 | 30 | 35 | 40 | 50 |

Step S402, calculating the volume percentage x of the larger particles and the particle size distribution (the volume percentage) of the larger and smaller particles according to the following equation;

$$a_b x + a_s(1-x) = a_r \quad (12)$$

where: $a_b$ and $a_s$ are the particle sizes of larger and smaller particles, m; $a_r$ is the optimal average particle size, m; x is the volume percentage of larger particles, no dimension;

Step S403, determining the volume percentage x of the larger particles obtained by the above calculation; and when x is less than 0.7, selecting smaller particles of a smaller order according to the correspondence table of common particle sizes and mesh numbers, and then repeating steps S401-S403 until x is greater than or equal to 0.7.

In a further technical solution, the specific process of the step S50 is as follows:

Step S501, based on the established hydraulic fracture expansion model, substituting the geological and engineering design parameters of the target area, and performing analog calculation on particle volumes of the five sets of different candidate temporary blocking agents by using the optimal average particle size $a_r$ and the particle size distribution (the volume percentages) obtained in step S40, to obtain five sets of different hydraulic fracturing results;

Step S502, then calculating the coefficient of variation of each hydraulic fracture length after five sets of different hydraulic fracturing by using the equation (11); and Step S503, based on the calculation results of the five sets of different hydraulic fracturing, selecting the particle volume of the candidate temporary blocking agent corresponding to the lowest value of $C_v$ as the particle volume Vr of the temporary blocking agent required for effective temporary blocking.

In a further technical solution, the specific process of the step S60 is as follows:

Step S601, according to the calculated optimal average particle size $a_r$, the particle size distribution and the particle volume of the temporary blocking agent required for effective temporary blocking, carrying out analog calculation of the fracturing operation process by using the established hydraulic fracture expansion model, predicting a fracture shape after fracturing, and calculating the coefficient of variation $C_v$ of each hydraulic fracture length;

when $C_v < 0.25$, it is considered that the temporary blocking optimization design is reasonable;

otherwise, returning to step S10, expanding the range of $\lambda_2$ by ±0.5 and performing the optimization calculation again.

After the preferred temporary blocking design and fracturing is performed in the target area, the length of each hydraulic fracture in the fracturing section is converted by the microseismic monitoring signal spreading length, and the coefficient of variation $C_v$ of each hydraulic fracture length is calculated according to Equation 11.

When $C_v < 0.25$, it is considered that the temporary block optimization design in the target area is effective, and each hydraulic fracture is evenly expanded.

Compared with the prior art, the invention has the following advantages: firstly, based on the displacement discontinuity method and the finite volume method, the hydraulic fracture expansion model is established, and the mechanics coupling between the fracture dynamic expansion process and the temporary blocking agent particle migration clogging behavior is realized. The defects of routine experiments and numerical evaluation methods that consider only the migration blockage of temporary blocking agent particles in static fractures are remedied. Secondly, the fracture model considers the mutual interference between multiple hydraulic fractures, and makes up for the defect that it is impossible for the existing evaluation method to analyze the steering behavior between fractures in fluid. Finally, according to the method of the present invention, quantitative calculation with the minimum fracture length variation coefficient as a optimization target is carried out, so that the invention has objectivity, accuracy and practicability.

DETAILED DESCRIPTION

The present invention will be further described below in conjunction with the embodiments and the accompanying drawings.

Taking a first section of a shale gas well SY in a block of Longmaxi Formation in southern Sichuan in China as an example, the specific reservoir geological and engineering parameters are shown in Table 2.

TABLE 2 key geological and engineering parameters of the first section of the shale gas well SY.

| | | | |
|---|---|---|---|
| Young Modulus, MPa | 28000 | Pumping time $t_s$ before temporary blocking, S | 600 |
| Poisson's ratio v | 0.2 | Fracture interval D, m | 10 |
| Fracturing fluid viscosity μ, MPa · s | 2 × 10⁻⁸ | Number N of hydraulic fractures in fracturing section | 3 |
| Total pumping flow Q of fracturing fluid, m³/s | 0.033 | Pumped dimensionless particle volume concentration Φ | 0.2 |
| Reservoir thickness h, m | 30 | Thickness density Δρ between particles and fracturing fluid, kg/m³ | 2000 |

In Step 1, based on equation (1), five sets of candidate values of the average particle sizes of the applicable temporary blocking agents are calculated: $a_1=1.09$ mm, $a_2=0.87$ mm, $a_3=0.73$ mm, $a_4=0.62$ mm, and $a_5=0.55$ mm.

Based on equation (2), five sets of candidate values of particle sizes of the applicable temporary blocking agents are calculated, and the temporary blocking experiment result ξ=2 m, which are $V_1=0.396$ m³, $V_2=0.297$ m³, $V_3=0.237$ m³, $V_4=0.198$ m³ and $V_5=0.170$ m³ respectively.

Figure 1:
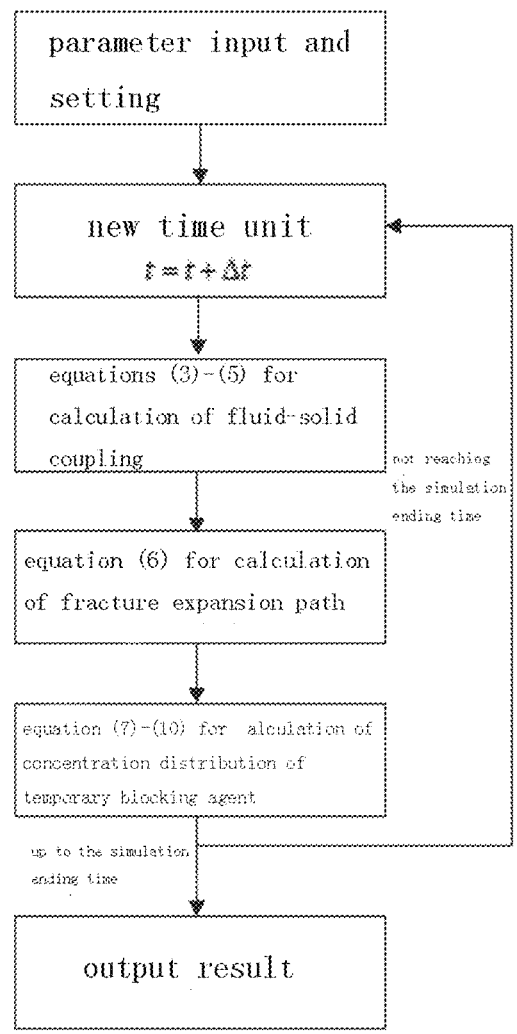
FIG. 1 is a flow chart for calculating a hydraulic fracture expansion calculation model established in Step 2.
Figure 2:
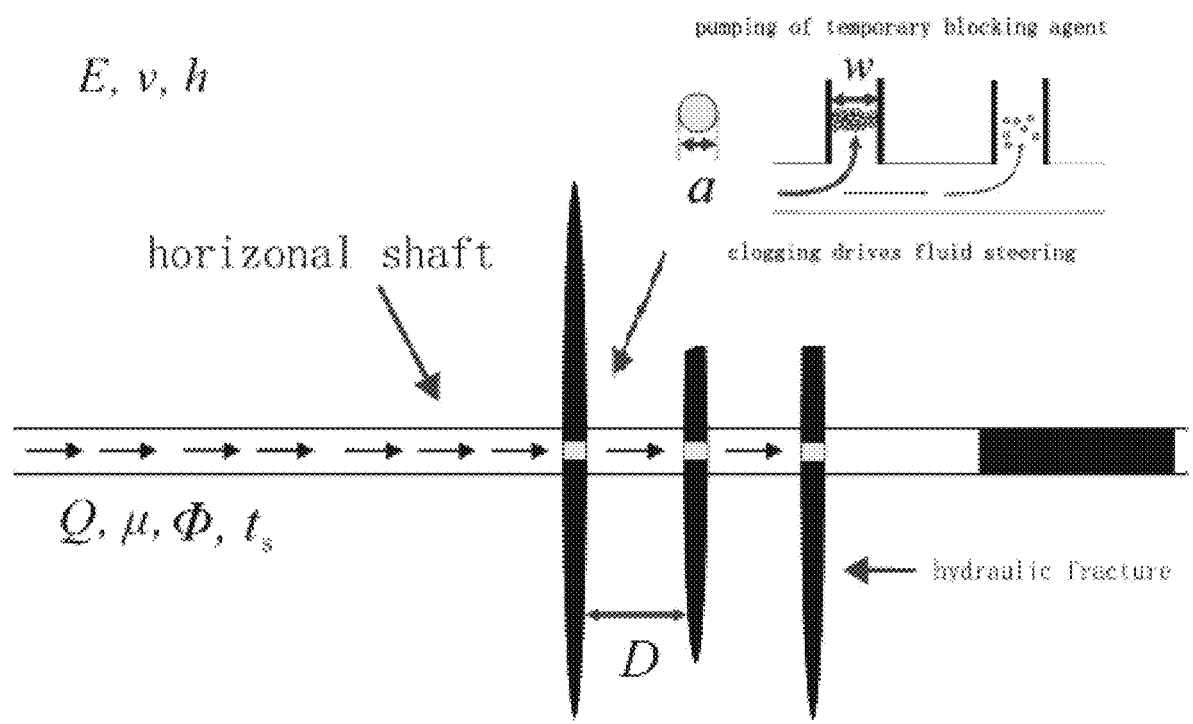
FIG. 2 is a schematic diagram of a model of a first section of a shale gas well SY (three clusters of perforations in the section).

In Step 2, based on the geological and engineering conditions of the first section of the shale gas well SY (Table 2), a hydraulic fracture expansion calculation model (FIG. 2) with complete fluid-solid coupling is established, and is solved according to the flow sequence of FIG. 1. The particle volume of the temporary blocking agent is set to $V_3=0.237$ m³, and the average particle sizes of five sets of different candidate temporary blocking agents are $a_1=1.09$ mm, $a_2=0.87$ mm, $a_3=0.73$ mm, $a_4=0.62$ mm and $a_5=0.55$, and are subjected to analog calculation (the pumping time is 1200 s) to obtain five sets of different hydraulic fracturing results. As shown in Table 3, the fracture length variation coefficient $C_v$ is determined by the equation (11) for the five sets of calculation results, and the average particle size $a_r=0.55$ mm of the temporary blocking agent corresponding to the lowest value of 0.204 is taken as the preferred result.

TABLE 3 the coefficient of variation $C_v$ of the fracture length calculated under the conditions of particle size $a_1$ to $a_5$.

| | Average particle size $a_r$ | | | | |
|---|---|---|---|---|---|
| | 1.09 mm | 0.87 mm | 0.73 mm | 0.62 mm | 0.55 mm |
| Coefficient of variation $C_v$ | 0.205 | 0.206 | 0.206 | 0.205 | 0.204 |

In Step 3, according to the preferred average particle size $a_r=0.55$ mm of the temporary blocking agent, two particles of 30 meshes and 35 meshes are selected for use in combination according to Table 1. According to equation (12), particles of 30 meshes account for 53%, and particles of 35 meshes account for 47%, which do not meet the requirement of 70% or more of large particles. Therefore, the temporary blocking agent particles of 30 meshes and 40 meshes are selected for use in combination, and the particle size distribution of particles of 30 meshes accounting for 77% and particles of 40 meshes accounting for 23% is calculated.

In Step 4, according to the average particle size and particle size distribution of the preferred temporary blocking agent, the particle volumes of five sets of different candidate temporary blocking agents are taken as $V_1=0.396$ m$^3$, $V_2=0.297$ m$^3$, $V_3=0.237$ m$^3$, $V_4=0.198$ m$^3$ and $V_5=0.170$ m$^3$ and subjected to analog calculation (the pumping time is 1200 s), to obtain five sets of different hydraulic fracturing results. As shown in Table 4, the fracture length variation coefficient $C_v$ is determined by the equation (11) for the five sets of calculation results, and the particle volume $V_r=0.237$ m$^3$ of the temporary blocking agent corresponding to the lowest value of 0.204 is taken as the preferred result.

TABLE 4

Fracture length variation coefficient $C_v$ calculated under the conditions of volume $V_1$ to $V_5$

| Volume V | 0.396 m$^3$ | 0.297 m$^3$ | 0.237 m$^3$ | 0.198 m$^3$ | 0.170 m$^3$ |
|---|---|---|---|---|---|
| Coefficient of variation $C_v$ | 0.499 | 0.239 | 0.204 | 0.282 | 0.720 |

Figure 3:
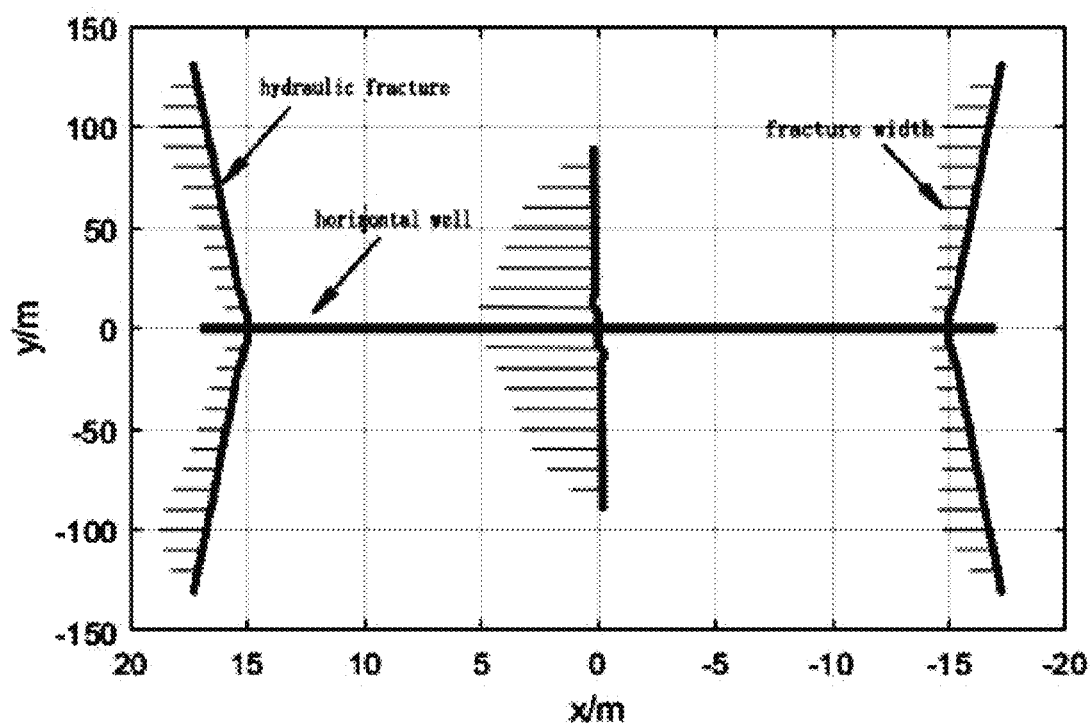
FIG. 3 is a fracture size pattern obtained by numerical simulation based on preferred parameters (the length of the gray horizontal line in the figure is 1000 times the scale width of the fracture enlarged).

In step 5, the numerical calculation of the fracturing operation is carried out by adopting the numerical model established in step 2 based on the preferred temporary blocking operation parameters, and the fracture morphology simulation result is shown in FIG. 3. Based on the equation (11), $C_v<0.25$ is satisfied, and the optimized design scheme is considered reasonable. According to the preferred temporary blocking agent parameters, the temporary blocking operation of the first section of the shale gas well SY is implemented. According to the roughly estimated length under the field micro-seismic data, $C_v=0.223$ is measured preliminarily, and the temporary blocking optimization design scheme is considered effective.

The above is not intended to limit the present invention in any form. The present invention has been disclosed by the above embodiments, but is not intended to limit the present invention. Any person skilled in the art can make some changes or modifications by using the technical content disclosed above to obtain equivalent embodiments in equivalent changes without departing from the scope of the technical solutions of the present invention. Any simple changes, or equivalent changes and modifications may be made for the above embodiments in accordance with the technical spirit of the present invention without departing from the contents of the technical solutions of the present invention, and are still within the scope of the technical solutions of the present invention.

The invention claimed is:

1. An optimized design method for a temporary blocking agent to promote uniform expansion of fractures produced by fracturing in horizontal wells, comprising the following steps:
   Step S10, collecting reservoir geological and engineering parameters of a target area, and calculating a particle size range and calculating a particle volume range of a candidate temporary blocking agent in an applicable target area;
   Step S20, establishing a hydraulic fracture expansion calculation model with complete fluid-solid coupling;
   Step S30, calculating an optimal average particle size required for effective temporary blocking based on the hydraulic fracture expansion calculation model;
   Step S40, determining a particle size distribution of the candidate temporary blocking agent according to the optimal average particle size;
   Step S50, calculating a particle volume of the candidate temporary blocking agent required for effective temporary blocking based on the hydraulic fracture expansion calculation model; and
   Step S60, predicting and evaluating a fracturing effect after a preferred temporary blocking agent is adopted in the target area; and pumping the preferred temporary blocking agent for synchronous expression of multiple fractures during hydraulic fracturing in the horizontal wells;
   wherein the hydraulic fracture expansion calculation model in the step S20 is as follows:

$$w = \Delta t[Q_s A(D, w)p] + \Delta t(Q_{V,n}/h)\delta + w_{t-1}$$

$$Q_s = (1-\phi)^2, \phi = \frac{C}{C_{max}}$$

$$\begin{cases} p_{in}^1 + p_p^1 = p_{in}^2 + p_p^2 = \ldots = p_{in}^n + p_p^n \\ Q = \sum_{n=1}^{N} Q_{V,n} \end{cases}$$

$$\tan(\theta/2) = -\frac{2\kappa}{1+\sqrt{1+8\kappa^2}}, \kappa = \lim_{r \to 0} \frac{u}{w}$$

$$w\phi - w_{t-1}\phi_{t-1} = \Delta t \nabla \left( BQ_s Q_p \frac{w^3}{12\mu} \nabla p - B\frac{a^2 w}{48\mu} \Delta \rho G_p \right) + \Delta t(Q_v/h)\Phi\delta$$

$$Q_p = 1.2\phi(1-\phi)^{0.1}$$

$$G_p = 2.3\phi(1-\phi)^2$$

-continued $$B = \begin{cases} 1 & w > 4a \\ \dfrac{w-3a}{4a-3a} & 4a \geq w \geq 3a \\ 0 & w < 3a \end{cases}$$

where: w is the width of a hydraulic fracture, m; $w_{t-1}$ is a fracture width of the previous time unit, m; D is a fracture spacing, m; p is a fluid pressure within the fracture, Mpa; A(D, w) is a fluid-solid coupling coefficient matrix, m·Mpa$^{-1}$; $\Delta t$ is a time unit, s; h is a reservoir thickness, m; δ is a Dirac δ function, representing a fracturing fluid injection point source, m$^{-1}$; $Q_s$ is a fluid flow behavior correction function, no dimension; C is a particle volume concentration, no dimension; $C_{max}$ is an extreme particle volume concentration, the value is 0.585, no dimension; φ is a dimensionless particle volume concentration of the temporary blocking agent, no dimension; $Q_{v,n}$ is a fracturing fluid pumping flow rate of the $n^{th}$ fracture, m$^3$/s; N is the number of hydraulic fractures in the fracturing section, no dimension; $p_{in}$ is a fracture inlet pressure of the $n^{th}$ fracture, Mpa; $p_p$ is the perforation hole friction of the $n^{th}$ fracture, Mpa; θ is a steering angle of the hydraulic fracture, no dimension; κ is a ratio of a type II stress intensity factor to a type I stress intensity factor, no dimension; $\varphi_{t-1}$ is a dimensionless particle volume concentration of the previous time unit, no dimension; u is the fracture surface shear amount, m; r is a distance between any point and a fracture tip of the hydraulic fracture, m; Φ is a dimensionless particle volume concentration of pumped fluid, no dimension; μ is pure fracturing fluid viscosity, Mpa·s; $Q_p$ is a temporary blocking agent particle migration behavior correction function, no dimension; $G_p$ is a temporary blocking agent particle settlement behavior correction function, no dimension; B is a temporary blocking agent particle blockage behavior correction function, no dimension; Δp is a density difference between the temporary blocking agent and a fracturing fluid, kg/m$^3$; a is the average particle size of the temporary blocking agent, m.

2. The optimized design method for the temporary blocking agent to promote uniform expansion of fractures produced by fracturing in horizontal wells according to claim 1, wherein a specific process of the Step S10 comprises:
   Step S101: collecting geological and engineering parameters of the target area; and
   Step S102, calculating a particle size range of the candidate temporary blocking agent according to the geological and engineering parameters of the target area, wherein an equation for calculating the particle size of the candidate temporary blocking agent is as follows:

$$a = \lambda_1^{-1}\left[\frac{12\mu Q^3 t_s^2(1-v^2)}{h^3 E}\right]^{\frac{1}{6}}$$

where: a is the average particle size of the candidate temporary blocking agent, m; E is the Young's modulus of a reservoir rock, Mpa; v is the Poisson's ratio of the reservoir rock, no dimension; μ is the viscosity of pure fracturing fluid, MPa·s; h is a reservoir thickness, m; $t_s$ is a pumping time before a temporary blocking operation, s; Q is a total pumping flow of fracturing fluid, m$^3$/s; $\lambda_1$ is a constant coefficient, no dimension;

the values of $\lambda_1$ are 4, 5, 6, 7, and 8, and an average particle size value of first five sets of different candidate temporary blocking agents is calculated;
Step S103, calculating the particle volume range of an applicable candidate temporary blocking agent by using the following equation;

$$V_p = \frac{C_{max}\xi}{\lambda_2}\left[\frac{12Q^3 h^3(1-v^2)\mu t_s^2}{E}\right]^{\frac{1}{6}}$$

where: E is the Young's modulus of the reservoir rock, MPa; v is the Poisson's ratio of the reservoir rock, no dimension; μ is the viscosity of the pure fracturing fluid, Mpa·s; h is the reservoir thickness, m; $t_s$ is the pumping time before temporary blocking operation, s; Q is the total pumping flow rate of fracturing fluid, m$^3$/s; $\lambda_2$ is a constant coefficient, no dimension; $V_p$ is the particle volume of the applicable temporary blocking agent, m; $C_{max}$ is an extreme particle volume concentration, the value is 0.585, no dimension; ξ is a stable temporary blocking layer thickness of temporary blocking agent particles, m, wherein
the values of $\lambda_2$ are 0.15, 0.2, 0.25, 0.3, and 0.35, and the particle volumes of second five sets of different candidate temporary blocking agents are calculated.

3. The optimized design method for the temporary blocking agent to promote uniform expansion of fractures produced by fracturing in horizontal wells according to claim 1, wherein a specific process of the Step S30 comprises:
   Step S301, based on the hydraulic fracture expansion calculation model for establishing complete fluid-solid coupling, substituting the geological and engineering parameters of the target area, taking the particle volume of the candidate temporary blocking agent calculated when $\lambda_2$ is 0.25, respectively taking the average particle size of the first five sets of different candidate temporary blocking agents and performing analog calculation to obtain five sets of different hydraulic fracturing results;
   Step S302, then calculating a coefficient of variation $C_v$ of each hydraulic fracture length after five sets of different hydraulic fracturing respectively by the following equation;

$$C_v = \frac{\sigma_1}{\left(\sum_n^N l_n\right)/N}$$

where: $C_v$ is the coefficient of variation of each hydraulic fracture length, no dimension; $\sigma_1$ is a standard deviation of each hydraulic fracture length, m; $l_n$ is a fracture length of the $n^{th}$ fracture, m; N is the number of hydraulic fractures in the fracturing section, no dimension;
   Step S303, based on the five sets of different hydraulic fracturing calculation results, selecting the average particle size of the candidate temporary blocking agent particles corresponding to the lowest $C_v$ value as the optimal average particle size $a_r$.

4. The optimized design method for the temporary blocking agent to promote uniform expansion of fractures produced by fracturing in horizontal wells according to claim 3, wherein a specific process of the Step S40 comprises:

Step S401, according to the optimal average particle size $a_r$ and a correspondence table between common particle sizes and mesh numbers, selecting two kinds of particles of larger and smaller particles for use in combination, wherein the particle size $a_b$ of the larger particle is larger than the optimal average particle size $a_r$, and the particle size $a_s$ of the smaller particle is less than the optimal average particle size $a_r$;

Step S402, calculating the volume percentage x of the larger particles and the particle size distribution of the larger and smaller particles according to the following equation;

$$a_b x + a_s(1-x) = a_r$$

where: $a_b$ and $a_s$ are the particle sizes of larger and smaller particles, m; $a_r$ is the optimal average particle size, m; x is the volume percentage of larger particles, no dimension; Step S403, determining the volume percentage x of the larger particles obtained by the above calculation; and when x is less than 0.7, selecting smaller particles of a smaller order according to the correspondence table between common particle sizes and mesh numbers, and then repeating steps S401-S403 until x is greater than or equal to 0.7.

5. The optimized design method for the temporary blocking agent to promote uniform expansion of fractures produced by fracturing in horizontal wells according to claim 4, wherein a specific process of the Step S50 comprises:

Step S501, based on the established hydraulic fracture expansion model, substituting the geological and engineering parameters of the target area, and performing analog calculation on particle volumes of the second five sets of different candidate temporary blocking agents respectively by using the optimal average particle size $a_r$ and the particle size distribution obtained in step S40, to obtain five sets of different hydraulic fracturing results;

Step S502, calculating the coefficient of variation of each hydraulic fracture length after five sets of different hydraulic fracturing by using the following equation:

$$C_v = \frac{\sigma_1}{\left(\sum_n^N l_n\right)/N}$$

where: $C_v$ is the coefficient of variation of each hydraulic fracture length, no dimension; $\sigma_1$ is a standard deviation of each hydraulic fracture length, m; $l_n$ is a fracture length of the $n^{th}$ fracture, m; N is the number of hydraulic fractures in the fracturing section, no dimension; and Step S503, based on the five sets of different hydraulic fracturing calculation results, selecting the particle volume of the candidate temporary blocking agent corresponding to the lowest value of $C_v$ as the particle volume of the temporary blocking agent required for effective temporary blocking.

6. The optimized design method for the temporary blocking agent to promote uniform expansion of fractures produced by fracturing in horizontal wells according to claim 5, wherein a specific process of the Step S60 comprises:

Step S601, according to the calculated optimal average particle size $a_r$, the particle size distribution and the particle volume of the temporary blocking agent required for effective temporary blocking, carrying out analog calculation on a fracturing operation process by using the established hydraulic fracture expansion model, predicting a fracture shape after fracturing, and calculating the coefficient of variation $C_v$ of each hydraulic fracture length;

when $C_v < 0.25$, it is considered that a temporary blockage optimization design is reasonable;

otherwise, returning to step S10, expanding the range of $\lambda_2$ by ±0.5 and performing the optimized design method again.

\* \* \* \* \*